March 12, 1968
C. E. SEELER
3,373,251
ELECTROSTATIC TRANSDUCER
Filed Feb. 23, 1965
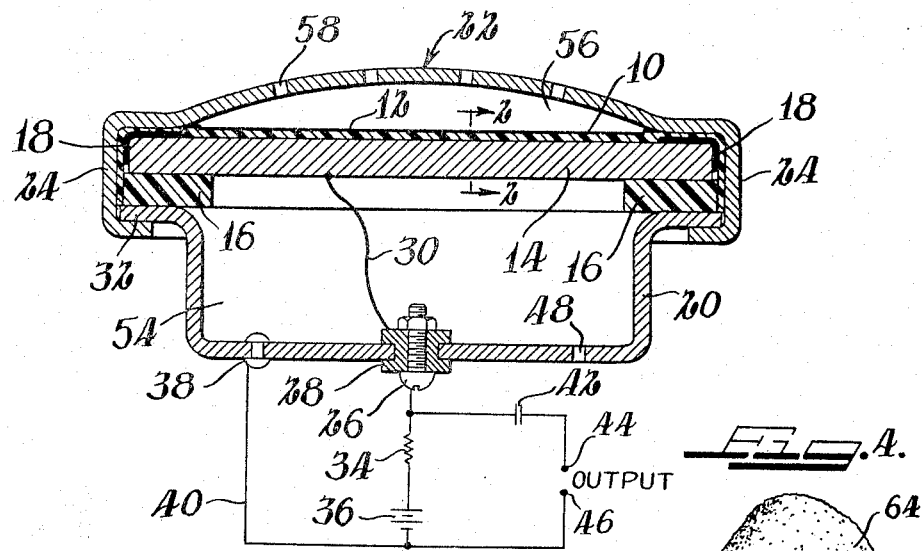
FIG. 1.
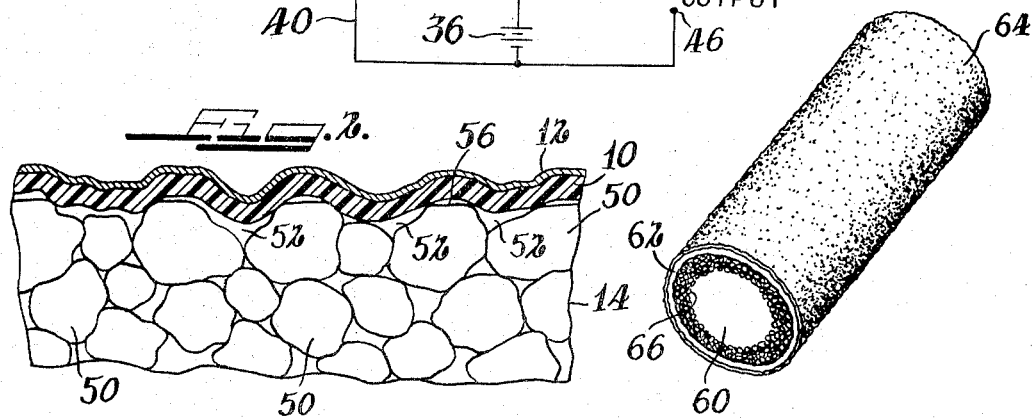
FIG. 2.
FIG. 4.
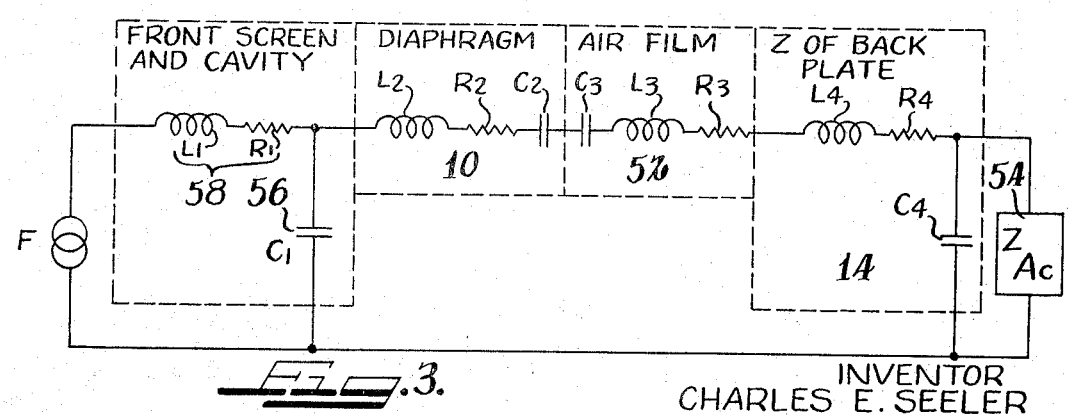
FIG. 3.
INVENTOR
CHARLES E. SEELER
BY Bair, Freeman &
Molinare Attys.

United States Patent Office 3,373,251
Patented Mar. 12, 1968

3,373,251
ELECTROSTATIC TRANSDUCER
Charles E. Seeler, Evanston, Ill., assignor to Shure Brothers Incorporated, a corporation of Illinois
Filed Feb. 23, 1965, Ser. No. 434,603
10 Claims. (Cl. 179—111)

This application relates generally to improvements in electrostatic transducers, such as are utilized in microphones, loudspeakers, and the like, and more particularly to a new and improved electrostatic transducer wherein a flexible diaphragm is mounted directly upon the surface of a porous backplate which serves as an acoustic impedance and an electric conductor as well as a mechanical support.

It is known to those skilled in the art to form electrostatic transducers of a flat, flexible, diaphragm, made of electrically conductive material or of plastic film having an electrically conductive coating, mounted in closely spaced relation to a flat, rigid backplate. In such prior apparatus, this spacing has required precise machining and assembly to insure free vibration of the diaphragm without touching the backplate. It also is known to perforate the backplate by relatively large holes and slots to permit air pulsations, created by the vibratory diaphragm in the volume formed between the diaphragm and the backplate, to be transmitted to other acoustic chambers or elements. When a bias voltage is applied between the backplate and diaphragm, electrical signals will be generated corresponding to the mechanical vibrations of the diaphragm.

Such prior types of electrostatic transducers are known to have certain deficiencies and disadvantages, in addition to having a relatively low electrical capacity. For example, high precision in manufacturing and cleanliness in assembly is required to avoid dust and other foreign matter in the small spacing between the diaphragm and backplate. In addition, there is the possibility of the diaphragm "blocking" or touching the backplate due to undue excitation, as may be caused in a microphone by large acoustical pulses such as pistol shots or door slams. In such cases, the diaphragm is pushed so close to the backplate that the electrostatic attraction becomes greater than the mechanical restoring force of the diaphragm and the diaphragm will thus fail to return to its normal position or will be pulled into contact with the backplate.

Still further, such prior transducer constructions are sensitive to changes in the bias voltage, which affect the transducer frequency response and output level as well as its stability. Above a certain maximum allowable bias voltage, the prior transducers become unstable, as when the electrostatic attraction between diaphragm and backplate becomes greater than the mechanical restoring force of the diaphragm, pulling the diaphragm towards the backplate where it adheres. In addition, care must be taken to prevent the mechanical diaphragm tension from changing with time since a lessening of tension reduces the restoring force of the diaphragm and, consequently, lessens the maximum allowable bias voltage, above which instability would occur.

Numerous attempts have been made by prior workers to overcome the above-noted problems of conventional electrostatic transducers. Examples of such efforts are disclosed in the prior patents to G. M. Sessler, Nos. 3,118,022 and 3,118,979. The prior suggested techniques involve the use of polarized plastic film as a vibratile diaphragm which is adapted to vibrate relative to the backplate. Sessler interposes one or more additional thin dielectric layers between the diaphragm and the backplate. As a result, the spacing between the diaphragm and the backplate is relatively large and the transducer capacitance is relatively low. For similar reasons, the transducer sensitivity is low because the electric field strength between the diaphragm and backplate is relatively low for the same bias voltage.

Further, and of utmost importance, Sessler's transducer includes blind holes as well as dielectric layers between the diaphragm and backplate such that the air bubbles entrapped therein do not communicate with the outside air thereby preventing atmospheric pressure equalization. As a result, the air bubbles expand and contract with changes of temperature and atmospheric pressure, thus changing the capacitance and sensitivity of the transducer. Also, since the air filled holes of this prior transducer are entirely enclosed, the acoustical impedance of the air bubbles is quite high and is reduced only by the use of the multiple layers which mechanically aligns these bubbles in series.

Accordingly, it is a general object of this invention to provide a new and improved electrostatic transducer which overcomes the above-noted deficiencies of the prior art devices.

It is a more specific object of this invention to provide a unique electrostatic transducer comprised of a porous backplate, which is partially or totally permeable to air, having directly positioned thereupon a thin plastic film diaphragm such that the plastic film touches the surface of the porous backplate at only certain distributed points, ridges or small areas, depending upon the surface texture of the backplate, to form a plurality of small vibratile areas.

It is another object of this invention to provide the thin plastic film diaphragm with an electrically conductive surface on the side opposite that in contact with the porous backplate, which surface may either be polarized in the form of an electret or have a bias voltage applied thereto, to provide the desired electrostatic field between the conductive layer on the diaphragm and the electrically conductive porous backplate.

It is still another object of this invention to dress the thin plastic film diaphragm to the textured surface of the porous backplate so that the surface texture of the diaphragm will be matched to that of the porous backplate in a controlled manner, thereby providing vibratile areas having very small spacing between the diaphragm and backplate to greatly enhance the capacity, sensitivity and efficiency of the invention over other electrostatic transducers.

It is a further object of this invention to provide a new and improved electrostatic transducer, as described, which, in effect, represents a condenser transducer having a large number of miniature condenser transducer segments electrically connected in parallel, whereby the performance of the total transducer is the average of the frequency responses and the electrical output of each transducer segment.

It is a still further object of this invention to provide a porous backplate of such surface texture and porosity as to control the mechanical impedance of the vibratile areas by the elimination of the acoustical impedance due to entirely enclosed air pockets or entrapped air bubbles between the diaphragm and backplate since the indentations of the backplate surface and the pores are in both direct and acoustical communication with the back of the backplate and the acoustical impedance, such as a cavity, located there.

It is still another object of this invention to provide a novel electrostatic transducer as described which includes means to vent the acoustical impedance behind the backplate so that the air pressure outside the transducer is equal to that of its interior and to eliminate changes of transducer capacity and sensitivity due to temperature and atmospheric pressure changes.

It is a still further object of this invention to provide an improved electrostatic transducer having a porous backplate and thin film diaphragm of high active capacitance obtained by maximizing the ratio of the capacitance of the total vibratile area to the capacitance of the total stationary area, as by utilizing the fewest possible anchor areas and by reducing the impedance of the vibratile areas, through the elimination of high acoustical impedance of totally enclosed air bubbles.

It is still another object of this invention to provide a porous backplate which in one embodiment is comprised of sintered material providing a large ratio of open area to land area to maximize the air communication between the air pockets beneath the diaphragm and the space behind the backplate, wherein resistance control is achieved by the tortuous air paths present in the sintered material and stiffness control is achieved by tensioning of the diaphragm, such tensioning being established for example, by dressing the surface of the diaphragm to the irregular and textured surface of the porous backplate.

It is a still further object of this invention to provide a new and improved electrostatic transducer as described which does not require high precision and cleanliness in assembly since the closely controlled spacing between diaphragm and backplate is established by the textured surfaces of the diaphragm and backplate and which has greater frequency response and output level stability at operating bias voltages and is not subject to blocking, and is characterized by higher electrical capacities and lower bias voltage requirements than may be achieved in prior electrostatic transducers of similar size.

It is a still further object to provide a transducer whose capacitance per unit area is considerably larger than the capacitance per unit area of conventional condenser transducers. Further with the present invention the bias required is much lower than the bias required for conventional condenser transducers of equal sensitivity and size.

The novel features which are characteristic of the invention are set forth with particularity in the appended claims. The invention itself, however, both as to its organization and method of operation, together with further objects and advantages thereof, will best be understood by reference to the following description taken in conjunction with the accompanying drawing in which:

FIGURE 1 is a cross-sectional view of an illustrative microphone embodiment of the electrostatic transducer invention;

FIGURE 2 is an enlarged view illustrating the manner in which the dressed flexible diaphragm is positioned directly upon the surface of the porous backplate;

FIGURE 3 is a schematic circuit diagram of the electrical analog of the acoustic and mechanical vibrating system of the invention; and FIGURE 4 shows an alternative embodiment of the invention in which the transducer is in the form of a hollow cylindrical rod.

Referring now to the drawing, and more particularly to FIGURE 1 thereof, there is shown one illustrative embodiment of an electrostatic transducer embodying the principles of the present invention. While for purposes of illustration, the electrostatic transducer of FIGURE 1 is depicted in the form of a pressure microphone, those skilled in the art will appreciate that the principles of the invention are not limtied to use with microphones alone, but rather, such principles find equally advantageous use in various other types of transducers, as for example, loudspeakers, pressure transducers and generally, any type of electromechanical transducer which serves to convert mechanical vibrations into electrical vibrations, or vice versa.

As illustrated in FIGURE 1, the novel electrostatic transducer comprises a thin film diaphragm 10 having its upper surface coated with a layer of electrically conductive material 12 and its bottom surface positioned directly upon the rigid backplate 14. In accordance with a unique feature of the present invention, the rigid backplate 14 is formed of a suitably porous material having a textured surface sufficient to avoid the entrapment of air bubbles and sufficiently closely spaced indentations and pores so as to form a plurality of vibratile areas in the diaphragm when it is positioned thereon as described in greater detail hereinbelow.

The diahpragm 10 is advantageously cemented to the peripheral rim of the backplate 14 so that the peripheral edges of the diaphragm are tightly secured to the peripheral rim of the backplate. Those skilled in the art will appreciate that this may be effected by any suitable means, as for example, by means of an insulating ring 18 having both sides coated with adhesive. It also will be appreciated that the insulating ring 18 also serves as additional protective insulation to prohibit any electrical short circuits between the conductive layer 12 of the diaphragm 10 and the backplate 14 when the system is clamped together.

Further, as shown in FIGURE 1 of the drawing, the peripheral edge of the diaphragm 10 advantageously protrudes beyond the outer diameter of the insulating ring 18 to form a depending skirt. The backplate diaphragm system comprised of the diaphragm 10, insulating ring 18 and backplate 14 is inserted into a cover 22 which is perforated so as to be permeable to sound and which provides protection for the system. An insulating washer 16 is positioned in place behind the backplate 14, locating the diaphragm skirt between the washer 16 and the lip 24 of the cover 22. A cover 20 is provided having a terminal 26 extending through its bottom wall within an insulated bushing 28 such that the terminal 26 is insulated from the case 20. A conductor 30 is connected to the lower surface of the backplate 14 and to the terminal 26 as shown in FIGURE 1 of the drawing. The case 20 then is inserted with its peripheral flange portion 32 abutting the lower surface of the insulating washer 16 and the entire assembly is secured as by causing the lip 24 of the cover 22 to be rolled over the flange 32 of the case, as shown in the drawing. Obviously, other means of assembling the component parts of the novel electrostatic transducer may be utilized, in lieu of the illustrative assembly technique shown in FIGURE 1, without affecting the principles of the present invention.

The electrical circuitry of the system embodiment utilizing external bias may be completed as shown in FIGURE 1. In any embodiment of the invention system which utilizes an electret diaphragm, the bias voltage source should be omitted. The case 20 is provided with a terminal 38 having a conductor 40 extending therefrom to connect to one terminal of a bias supply 36. The other terminal of the bias supply 36 is connected to a resistance 34 to the terminal 26, which, as described above, is connected to the undersurface of a backplate 14. The terminal 26 may be connected through the capacitor 42 to one output terminal 44, while the terminal 38 is connected through the conductor 40 to the other output terminal 46. Thus, it can be seen that the conductive coating 12 of the diaphragm 10 is in electrical contact with the case 22 and that the external bias is applied between the case terminal 38 and the insulated terminal 28 such that the external bias exists between the coated surface 12 of the diaphragm and the backplate 14. The depending skirt of the diaphragm 10 and the insulating washer 16 serves to insulate the backplate 14 from the case 22. As stated above, if an electret diaphragm is used, the bias supply 36 is not necessary and terminals 26 and 38 become the output terminals; it further will be appreciated that in this case, elements 34, 40, 42, 44 and 46 are also unnecessary.

In accordance with a further feature of this embodiment of the invention, the case 20 is vented as by means of the opening 48 extending through the bottom wall of the case. This barometric pressure equalization vent serves to equalize long term air pressure differences between the inside of the microphone and the surrounding environment. Now that the construction of the illustrative embodiment of FIGURE 1 has been set forth, the individual novel features and unique components of the present invention, together with its operation, will be described in detail.

As illustrated in the enlarged view in FIGURE 2, the porous backplate 14 advantageously is formed of suitable texture and porosity so as to avoid the entrapment of air bubbles beneath the diaphragm 10. It has been found that a suitably porous backplate may be formed by the use of sintered porous metals, by wire mesh screens, by chemically or mechanically perforated screens, by metallic foams or metalized plastic or ceramic materials and the like. In one preferred embodiment of the invention, the porous backplate was formed by the use of ball-shaped bronze powder, utilizing .003 to .020 inch diameter particles, which was compressed and heat treated to provide desired porosity. As illustrated in FIGURE 2, the particles 50 forming the porous backplate advantageously may provide a tortuous air path beneath the diaphragm 10 to the back of the backplate to enable the acoustic resistance of the backplate to be maintained at a desired value. In addition, it will be noted that the ratio of the air space-areas beneath the diaphragm 10 to the areas of contact between the diaphragm 10 and the surfaces of the particles 50 is sufficiently high so as to maximize the air communication between the air pockets beneath the diaphragm and the space behind the backplate. In addition to this high ratio of air space-area to contact area, the assembly is characterized by the large amount of peripheral edges around the multiple holes and by the curvatures of such edges which further enhance the operation of the electrostatic transducer.

The plastic film diaphragm 10 advantageously may be formed of any suitable material such as Mylar, Teflon or polypropylene, as examples. The uncoated side of the diaphragm 10 touches the surface of the porous backplate only at certain points, ridges or small areas, depending upon the surface texture of the backplate and of the diaphragm. While the present invention provides highly desirable performance with an untextured diaphragm 10, it is a further unique feature of the present invention to cause the diaphragm 10 to be dressed to the textured surface of the porous backplate 14. This may be effected by causing the diaphragm 10 to be pressed down upon the backplate, or to be heated, or both, such that the diaphragm 10 will be provided with a texture corresponding closely but not exactly matching the backplate surface texture. At the points, ridges or areas of mechanical contacts between the textured diaphragm 10 and the textured surface of the backplate 14 (stationary areas), the diaphragm will not be capable of mechanical vibration, but it will be capable of such vibrations in between such areas of contact, such as where there are pores or deep indentations in the porous backplate. These areas, identified by the reference numeral 52 in FIGURE 2, are designated as the vibratile areas of the diaphragm, and in those areas, the diaphragm will have a spacing of irregular width called the spacing widths to the backplate. Thus, those skilled in the art will appreciate that the inventive system effectively represents a condenser transducer comprised of a large number of miniature condenser transducer segments electrically connected in parallel and averaging the frequency responses and electrical output of each transducer segment, which are different because the vibrating area and the space width of one transducer segment is different from that of the others. However, because of the dressing action of the electrostatic attraction causing the diaphragm to be stretched across the pores and indentations of the textured backplate 14 or by applying mechanical tension to the diaphragm (for instance by spherically deforming the diaphragm-backplate assembly), the transducer segments may be mechanically stiffness controlled in a wide frequency band, and phase differences of their electrical outputs are small, preventing cancellation effects which would appear as zero output of the whole transducer. Another effect contributing to the stiffness of the transducer elements, comes into play when the ratio of the vibratile areas to the diaphragm thickness becomes small; in this case, the vibratile area does not vibrate so much as a stretched diaphragm but more as a stiff plate.

It further will be noted that the air in the spaces beneath the vibratile areas 52 can communicate directly through the pores of the backplate either into its interior or completely through the backplate into the cavity 54 beneath the backplate. Thus, the formation of pockets of entrapped air is prevented, as in the case of the prior art electrostatic transducers, and the undesirable effects of changing temperature and pressure are eliminated. Since the pores in the backplate permit communication of the air pulsation beneath the vibratile areas with other acoustical chamber configurations or acoustical elements behind the backplate, such as the cavity 54, the acoustical behavior of the whole transducer may be altered as desired.

It further will be noted that by changing the surface texture and the porosity of the backplate, or by choice of the proper bias voltage, the frequency response and output level of the transducer may be changed. For example, the surface texture of a porous backplate may be altered by pressing, grinding, lapping, or etching the surface to control the irregularities of the backplate surface as desired.

Those skilled in the art will appreciate that it is desirable to construct the electrostatic transducer with the highest possible capacitance and the highest possible sensitivity or output voltage per unit sound pressure and within a specified frequency range. The construction of the present invention is most advantageous since for a given bias voltage, these desirable ends may be accomplished if the capacitance of the transducer is mostly active rather than stationary, if the average spacing distance between the backplate and diaphragm is very small, and if the mechanical impedance of the vibratile area is made suitable to fulfill the bandwidth requirements, all of which exist in the present invention. The capacitance of the system, as measured between the conductive coating 12 of the diaphragm 10 and the backplate 14, may be divided into an active capacitance and a stray capacitance. The active capacitance is that capacitance associated with the vibratile areas or that which is modulated mechanically to transduce mechanical into electrical energy. It is the sum of the capacitances of all vibratile areas of the diaphragm. The stray capacitance is the one which is not mechanically modulated, and consists of the capacitance of the mechanical support in the transducer system as well as the capacitance of the stationary or non-vibratile areas of the diaphragm. It will be appreciated that the stationary areas are not only the anchor areas where the diaphragm touches the backplate permanently and is supported, but in addition are those areas of the diaphragm which exhibit a high mechanical impedance to the mechanical excitation force. Since this impedance is generally dependent upon the frequency of excitation, the stationary areas at one frequency may become vibratile areas at another frequency.

A high active capacitance is obtained in the present invention by providing the fewest possible stationary areas, that is, the ratio of capacitance of the total vibratile area to the capacitance of the total stationary area is relatively high. This is accomplished by providing the smallest possible anchor areas and the lowest permissible impedance of the vibratile areas consistent with the bandwidth requirements through the use of the porous backplate. Of course, the number of anchor areas should not be too small so as to not have any large unsupported diaphragm areas which may collapse against the backplate when electrical bias is supplied to the transducer. A suitably low impedance is obtained by providing the porous backplate with a texture having numerous indentations, all of which communicate with pores, which, in turn, communicate to a suitable acoustic network located behind the backplate, such as the cavity 54 of FIGURE 1.

As shown in FIGURE 2, after the diaphragm 10 is dressed to the surface of the porous backplate, processed to provide a permanent replica of the backplate surface texture, and is removed therefrom, the diaphragm with its molded texture will return to the backplate with it natural surface texture, with both textures being quite closely, but not entirely, matched. This slight mismatch is due to the fact that the diaphragm is stressed and slightly stretched during its movement away from the porous backplate. As such, the diaphragm 10 will not be firmly attached to the porous backplate 14 over its entire area, but rather will lie loosely on its surface, supported by small contact areas distributed over the textured surface of the backplate. The contact areas which support the diaphragm, do not necessarily coincide with the projections of the backplate since these contact areas may also lie on the slopes between the indented and protruding parts of the backplate. Because of this, the vibratile area of the diaphragm may lie opposite the protruding part of the backplate. If desired, the protruding part of the backplate may be partially flattened, as by filing, grinding, lapping or compressing of the backplate, shown at 56 on FIGURE 2, to place the vibratile areas very closely spaced to the flattened areas, which then contribute substantially to the active capacity and to the sensitivity of the system.

FIGURE 3 illustrates the electrical analog of the acoustic and mechanical vibrating system for the illustrative embodiment of FIGURE 1. As shown in FIGURE 3, the symbol F represents the activating force; the symbol $C_1$ represents the volume between the protective cover 22 and the diaphragm 10; the symbols $L_1$ and $R_1$, respectively, represent the effective mass and resistance of the openings 58 in the protective cover 22; the symbol $C_2$ represents the effective compliance of the diaphragm due to tension, thickness and diaphragm and size of vibratile area; the symbols $L_2$ and $R_2$, respectively, represent the effective mass and resistance of the diaphragm; the symbol $C_3$ represents the stiffness of the air film between the diaphragm 10 and the porous backplate 14; the symbols $L_3$ and $R_3$, respectively, represent the effective mass and resistance of this air film; the symbol $C_4$ represents the effective compliance of the air passages within the porous backplate 14; the symbols $L_4$ and $R_4$, respectively, represent the effective mass and resistance of these air passages; and the symbol $Z_{AC}$ represents the effective acoustical impedance of termination in a system such as the one illustrated in FIGURE 1 having an enclosed cavity behind the backplate.

However, the system is not confined to a simple acoustical impedance as represented by the cavity behind the backplate, shown as 54 in FIGURE 1. For instance, the cavity may be left open at its back so that the acoustical impedance $Z_{AC}$ in FIGURE 3 is the impedance of free air. Indeed, the back of the backplate may be made accessible to sound vibrations as is the front of the diaphragm; or alternatively, the front of the diaphragm may be exposed to a suitable acoustic impedance while the back of the backplate is exposed to sound; or alternatively, both sides of the system may be exposed to sound over suitable impedances. In other configurations the back of the backplate may be terminated by an infinite acoustic impedance, such as a solid wall member, so that the air contained within the backplate becomes an effective terminating impedance.

Those skilled in the art will now appreciate that by suitable choice of the parameters of the system, the frequency response of the transducer may be changed. For instance, if the resistances and compliances are chosen such that the resistances predominate over the compliances within a certain frequency band, the transducer is resistance controlled. If the contrary is true, the transducer is stiffness or mass controlled. The impedance $L_2$ may be changed by varying the thickness and the specific gravity of the diaphragm material and its conductive coating. The impedances $C_3$, $L_3$, and $R_3$ may be altered by suitable selection of surface texture of the backplate. A coarse texture with large solid and flat areas increase $R_3$ more than $C_3$, in comparison to a texture which is finely grained. The impedances $L_4$, $C_4$, and $R_4$, which is the impedance of the backplate as measured from one of its sides to the other, may be altered by choosing the proper backplate material and the thickness of the backplate. For instance, a chemically etched screen would have very low values of $L_4$, $C_4$, and $R_4$, while a porous sintered material would have rather large values of $R_4$, depending upon the thickness, the size of the particles used in the manufacture, and possible other modifications, as for example, subsequent coining or etching operations after sintering.

The impedance of the acoustic termination $Z_{AC}$ may be chosen to suit frequency response requirements. These impedances may communicate with the outside of the transducer or with other acoustical elements, as pointed out hereinabove. It is advantageous to use a backplate which is rigid and which does not vibrate when the diaphragm is excited mechanically or acoustically.

Those skilled in the art will also appreciate the further distinct feature of the present invention which is that the shape of the transducer need not be limited to one of radial symmetry, as is the case with conventional condenser transducers. Thus, the backplate with its contacting flexible film can be given any desired shape, such as round, square, rectangular or the like. In addition, the surface of the porous backplate need not be of average flatness but may be convex or concave. Also, there is no restriction in the application of the principles of the present invention to a disc-shaped transducer since the film may be dressed around a rod-shaped backplate, a sphere, or even inside or outside of the porous cylinder. FIGURE 4 of the drawing illustrates the invention as applied to a hollow, cylindrical backplate which comprises the hollow rod 60 formed of porous material and having an external textured surface 62. A diaphragm 64 similar to diaphragm 10 of FIGURE 2 is dressed around the external surface 62 of the rod 60. Those skilled in the art will appreciate that the diaphragm 64 may, if desired, be dressed around the internal textured surface 66 of the rod 60 and that the latter may be formed in any desired shape such as a coil, spiral, helix and the like. Thus, it is possible to give the porous backplate any desired shape or configuration so as to take advantage of the acoustical properties such configurations may have to obtain the desirable frequency response or directional characteristics.

The invention described also is applicable to a reversible transducer and therefore, could be used to convert electrical vibrations into mechanical vibrations or vice versa. As such, this system can be used as either a microphone, a loudspeaker, or any other type of pressure responsive transducer. A loudspeaker, for example, could be in the form of a flat disc which can be shaped as tiles and attached in any number to walls or ceilings of a room. Other shapes, such as spheres, parabolae or horns, all consisting of film covered porous material may be designed by those skilled in the art, depending upon the acoustical property desired, fully in accordance with the present invention.

It further will be appreciated that the conductive coating on the diaphragm need not be continuous so as to cover the whole area of the plastic film positioned on the porous backplate. If desired, the conductive coating may be designed to cover only a part of this area. In fact, a conductive coating may cover areas on the plastic film which are suitably patterned and electrically insulated from each other, with each connected to separate electrical circuits chosen for the desired performance of the transducer. Such a multiple pattern arrangement on the thin film may be accomplished by printing conductive ink onto the thin film, or by vacuum depositing a conductive coating with the help of masks, or in any other way known to those skilled in the art.

Similarly, the backplate may be segmented and divided into patterns which are geometrically continuous but which are electrically insulated from each other. These segments then may be connected to separate electrical circuits chosen for their desired performance of the transducer.

Still further, the porosity of the backplate need not be uniform, but may change from point to point so as to form areas of greater or lesser porosity beneath the flexible diaphragm. If desired, the porous backplate may be perforated by discrete holes or slots, if the performance of the transducer so requires.

While there has been shown and described a specific embodiment of the present invention, it will, of course, be understood that various modifications and alternative constructions may be made without departing from the true spirit and scope of the invention. Therefore, it is intended by the appended claims to cover all such modifications and alternative constructions as fall within their true spirit and scope.

What is claimed as the invention is:

1. The improvement of an electrostatic transducer comprising the combination of a porous backplate, said porous backplate having a textured surface formed by a plurality of closely spaced indentations and pores, a flexible film diaphragm positioned upon the textured surface of said porous backplate such that the film diaphragm is supported by only distributed points, ridges and small areas of the textured surface to form a plurality of vibratile areas on the diaphragm where the latter is spaced from the backplate, an acoustical impedance at the side of the backplate opposite the side contacting the diaphragm, said porous backplate having a plurality of air paths extending therethrough to place the air spaces beneath the vibratile areas in air communication with said acoustical impedance, a layer of electrically conductive material on the side of the diaphragm opposite the side in contact with the backplate, and electrical conductors connected to the conductive layer on the diaphragm and to the backplate to permit electrical connections to be made to the transducer.

2. The improvement of an electrostatic transducer in accordance with claim 1 wherein said porous backplate is formed of a sintered metallic material providing a tortuous air path between said air spaces and said acoustical impedance.

3. The improvement of an electrostatic transducer comprising the combination of a porous backplate, said porous backplate having a textured surface formed by a plurality of closely spaced indentations and pores, a flexible film diaphragm positioned upon the textured surface of said porous backplate such that the film diaphragm is supported by only distributed points, ridges and small areas of the textured surface to form a plurality of vibratile areas on the diaphragm where the latter is spaced from the backplate, an acoustical impedance at the side of the backplate opposite the side contacting the diaphragm, said porous backplate having a plurality of air paths extending therethrough to place the air spaces beneath the vibratile areas in communication with said acoustical impedance, the textured surface of said porous backplate having a high ratio of air space area to land area to maximize the air communication between said air spaces and said acoustical impedance, a layer of electrically conductive material on the side of the diaphragm opposite the side in contact with the backplate, and electrical conductors connected to the conductive layer on the diaphragm and to the backplate to permit electrical connections to be made to the transducer.

4. The improvement of an electrostatic transducer comprising the combination of a porous backplate, said porous backplate having a textured surface formed by a plurality of closely spaced indentations and pores, a flexible film diaphragm positioned upon the textured surface of said porous backplate such that the film diaphragm is supported by only distributed points, ridges and small areas of the textured surface to form a plurality of vibratile areas on the diaphragm where the latter is spaced from the backplate, said flexible film diaphragm being dressed to the surface of said backplate such that the diaphragm is provided with a textured surface closely matched to the textured surface of the porous backplate, an acoustical impedance at the side of the backplate opposite the side contacting the diaphragm, said porous backplate having a plurality of air paths extending therethrough to place the air spaces beneath the vibratile areas in air communication with said acoustical impedance, a layer of electrically conductive material on the side of the diaphragm opposite the side in contact with the backplate, and electrical conductors connected to the conductive layer on the diaphragm and to the backplate to permit electrical connections to be made to the transducer.

5. The improvement of an electrostatic transducer comprising the combination of a porous backplate, said porous backplate having a textured surface formed by a plurality of closely spaced indentations and pores, a flexible film diaphragm positioned upon the textured surface of said porous backplate such that the film diaphragm is supported by only distributed points, ridges and small areas of the textured surface to form a plurality of vibratile areas on the diaphragm where the latter is spaced from the backplate, an air cavity providing a low acoustical impedance at the side of the backplate opposite the side contacting the diaphragm, said porous backplate having a plurality of air paths extending therethrough to place the air spaces beneath the vibratile areas in air communication with said cavity, a layer of electrically conductive material on the side of the diaphragm opposite the side in contact with the backplate, and electrical conductors connected to the conductive layers on the diaphragm and to the backplate for applying a bias voltage between the conductive layer of said diaphragm and the backplate.

6. The improvement of an electrostatic transducer comprising the combination of a porous backplate, said porous backplate having a textured surface formed by a plurality of closely spaced indentations and pores, a flexible film diaphragm positioned upon the textured surface of said porous backplate such that the film diaphragm is supported by only distributed points, ridges and small areas of the textured surface to form a plurality of vibratile areas on the diaphragm where the latter is spaced from the backplate, an air cavity providing a low acoustical impedance at the side of the backplate opposite the side contacting the diaphragm, said porous backplate having a plurality of air paths extending therethrough to place the air spaces beneath the vibratile areas in air communication with said cavity, a polarized electret layer on the side of the diaphragm opposite the side in contact with the backplate, and electrical conductors connected to the conductive layer on the diaphragm and to the backplate to permit electrical connections to be made to the transducer.

7. The improvement of an electrostatic transducer comprising the combination of a porous backplate, said porous backplate having a textured surface formed by a plurality of closely spaced indentations and pores, a flexible film diaphragm positioned upon the textured surface of said porous backplate such that the film diaphragm is supported by only distributed points, ridges and small areas of the textured surface to form a plurality of vibratile areas on the diaphragm where the latter is spaced from the backplate, a closed air cavity providing a low acoustical impedance at the side of the backplate opposite the side contacting the diaphragm, said porous backplate having a plurality of air paths extending therethrough to place the air spaces beneath the vibratile areas in air communication with said cavity, means for venting said air cavity such that the air pressure within the cavity is equal to the air pressure outside of the transducer, thereby eliminating any changes of transducer capacity and sensitivity due to temperature and atmospheric pressure changes, a layer of electrically conductive material on the side of the diaphragm opposite the side in contact with the backplate, and electrical conductors connected to the conductive layer on the diaphragm and to the backplate to permit electrical connections to be made to the transducer.

8. The improvement of an electrostatic transducer comprising the combination of a porous backplate, said porous backplate having a textured surface formed by a plurality of closely spaced indentations and pores, a flexible film diaphragm positioned upon the textured surface of said porous backplate such that the film diaphragm is supported by only distributed points, ridges and small areas of the textured surface to form a plurality of vibratile areas on the diaphragm where the latter is spaced from the backplate, a closed air cavity providing a low acoustical impedance at the side of the backplate opposite the side contacting the diaphragm, means for venting said air cavity to equalize the air pressures within and outside of said transducer to thereby eliminate any changes of transducer capacity and sensitivity due to temperature and atmospheric pressure changes, said porous backplate being formed of sintered metallic material providing a plurality of tortuous air paths extending therethrough to place the air spaces beneath the vibratile areas in maximum air communication with said cavity, a layer of electrically conductive material on the side of the diaphragm opposite the side in contact with the backplate, and electrical conductors connected to the conductive layer on the diaphragm and to the backplate to permit electrical connections to be made to the transducer.

9. The improvement of an electrostatic transducer comprising the combination of a porous backplate, said porous backplate having a textured surface formed by a plurality of closely spaced indentations and pores, a flexible film diaphragm positioned upon the textured surface of said porous backplate such that the film diaphragm is supported by only distributed points, ridges and small areas of the textured surface to form a plurality or vibratile areas on the diaphragm where the latter is spaced from the backplate, a cover for said backplate and diaphragm, said cover having openings to permit pressure signals to be applied to said diaphragm, an air cavity providing a low acoustical impedance at the side of the backplate opposite the side contacting the diaphragm, said porous backplate having a plurality of air paths extending therethrough to place the air spaces beneath the vibratile areas in air communication with said cavity, a layer of electrically conductive material on the side of the diaphragm opposite the side in contact with the backplate, and electrical conductors connected to the conductive layer on the diaphragm and to the backplate to permit electrical connections to be made to the transducer.

10. The improvement of an electrostatic transducer comprising the combination of a porous backplate, said porous backplate having a textured surface formed by a plurality of closely spaced indentations and pores, a flexible film diaphragm positioned upon the textured surface of said porous backplate such that the film diaphragm is supported by only distributed points, ridges and small areas of the textured surface to form a plurality of vibratile areas on the diaphragm where the latter is spaced from the backplate, a cover and a case enclosing said porous backplate and said diaphragm, said cover having openings to permit sound pressure to be applied to said diaphragm, said diaphragm being in electrical contact with said cover and case, and said backplate being electrically insulated from said cover and case, said case defining an air cavity providing a low acoustical impedance at the side of the backplate opposite the side contacting the diaphragm, said porous backplate having a plurality of air paths extending therethrough to place the air spaces beneath the vibratile areas in air communication with said cavity, a layer of electrically conductive material on the side of the diaphragm opposite the side in contact with the backplate, and electrical conductors connected to the conductive layer on the diaphragm and to the backplate to permit electrical connections to be made to the transducer.

No references cited.

KATHLEEN H. CLAFFY, *Primary Examiner.*

A. A. McGILL, *Assistant Examiner.*